(12) United States Patent
Sugahara et al.

(10) Patent No.: US 9,002,388 B2
(45) Date of Patent: Apr. 7, 2015

(54) RADIO WAVE ARRIVAL STATUS ESTIMATING SYSTEM, ITS METHOD AND PROGRAM

(75) Inventors: Hiroto Sugahara, Tokyo (JP); Masahiro Motoyoshi, Tokyo (JP); Takashi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 920 days.

(21) Appl. No.: 12/676,567

(22) PCT Filed: Sep. 4, 2008

(86) PCT No.: PCT/JP2008/065941
§ 371 (c)(1),
(2), (4) Date: Mar. 4, 2010

(87) PCT Pub. No.: WO2009/031604
PCT Pub. Date: Mar. 12, 2009

(65) Prior Publication Data
US 2010/0255803 A1    Oct. 7, 2010

(30) Foreign Application Priority Data
Sep. 7, 2007 (JP) ................................. 2007-233454

(51) Int. Cl.
*H04B 15/00* (2006.01)
*H04L 1/00* (2006.01)
(Continued)

(52) U.S. Cl.
CPC .......... *H04B 7/0413* (2013.01); *H04B 17/0075* (2013.01); *H04B 17/009* (2013.01); *H04L 25/0204* (2013.01); *H04B 17/0092* (2013.01); *H04B 17/0097* (2013.01)

(58) Field of Classification Search
CPC .. H04B 7/0413; H04B 17/0097; G06T 15/06; G06F 17/18; G01S 1/02
USPC .......... 455/39, 65, 67.11, 67.13, 67.16, 446; 370/465, 310, 334
See application file for complete search history.

(56) References Cited

U.S. PATENT DOCUMENTS

| 5,974,329 A * | 10/1999 | Wylie et al. ................ 455/456.1 |
| 2003/0124976 A1 * | 7/2003 | Tamaki et al. ................... 455/15 |

(Continued)

FOREIGN PATENT DOCUMENTS

| GB | 2445385 | * | 7/2008 | .............. G01S 11/06 |
| GB | 2478243 | * | 8/2011 | .............. G01S 11/06 |

(Continued)

OTHER PUBLICATIONS

Nurmela, V., et al. "Additional information to invention Report NC53517: Improved Distance Estimation Method Based on Received Signal Power." Nokia Research Center, Sep. 22, 2006.*

(Continued)

*Primary Examiner* — Wesley Kim
*Assistant Examiner* — Devan Sandiford
(74) *Attorney, Agent, or Firm* — Sughrue Mion, PLLC

(57) ABSTRACT

A radio wave arrival status estimating system characterized by having an estimating means that estimates whether the physical characteristic of a radio wave received at the reception point of a radio system to be evaluated has reached the minimum allowable level for determining the characteristic of the radio system; that estimates an arrival status of the radio wave at the reception point by applying a first radio wave propagation status estimating technique to the reception point when estimating that the physical characteristic has reached the minimum allowable level; and that estimates an arrival status of the radio wave at the reception point by applying a second radio wave propagation status estimating technique to the reception point when estimating that the physical characteristic has not reached the minimum allowable level.

11 Claims, 3 Drawing Sheets

(51) Int. Cl.
  *G06F 11/00*  (2006.01)
  *H04B 7/04*   (2006.01)
  *H04B 17/00*  (2006.01)
  *H04L 25/02*  (2006.01)

(56) References Cited

U.S. PATENT DOCUMENTS

| | | | |
|---|---|---|---|
| 2005/0124368 A1* | 6/2005 | Diao et al. | 455/522 |
| 2006/0012523 A1* | 1/2006 | Schmid et al. | 342/451 |
| 2007/0093212 A1 | 4/2007 | Sugahara et al. | |
| 2008/0219375 A1* | 9/2008 | Yun et al. | 375/267 |
| 2009/0128411 A1* | 5/2009 | Sugahara et al. | 342/385 |
| 2010/0203839 A1* | 8/2010 | Duan et al. | 455/67.11 |
| 2010/0315289 A1* | 12/2010 | Nurmela et al. | 342/385 |

FOREIGN PATENT DOCUMENTS

| | | |
|---|---|---|
| JP | 9-33584 A | 2/1997 |
| JP | 9-153867 A | 6/1997 |
| JP | 2003198442 A | 7/2003 |
| JP | 2007101376 A | 4/2007 |
| WO | 2005088868 A1 | 9/2005 |
| WO | 2007043416 A | 4/2007 |
| WO | WO 2007043416 * 4/2007 | ............. G01R 29/08 |
| WO | WO 2008080450 * 7/2008 | ............... H04B 7/02 |

OTHER PUBLICATIONS

International Search Report for PCT/JP2008/065941 mailed Oct. 28, 2008.

K. H. Ng et al., "Efficient Multielement Ray Tracing With Site-Specific Comparisons Using Measured MIMO Channel Data", IEEE Transactions on Vehicular Technology, vol. 56, No. 3, May 2007, pp. 1019-1032.

Y. Hosoya et al., "Radio Wave Propagation Handbook", Realize Inc., pp. 234-243, 1999.

Japanese Office Action for JP2009-531266 mailed on Oct. 31, 2012.

Georgia E. Athanasiadou, "Incorporating the Fresnel Zone Theory in Ray Tracing for Propagation Modelling of Fixed Wireless Access Channels", The 18th Annual IEEE International Symposium on Personal, Indoor and Mobile Radio Communications (PIMRC"07), IEEE, Sep. 1, 2007, pp. 1-5, XP031168831.

The Extended European Search Report (EPSR) of EP Application No. 08829538.1 dated on Apr. 23, 2014.

* cited by examiner ated Sep. 4, 2008, which is based upon and claims the benefit of priority from Japanese patent application No. 2007-233454, filed on Sep. 7, 2007, the disclosure of which is incorporated herein in its entirety by reference.

RADIO WAVE ARRIVAL STATUS ESTIMATING SYSTEM, ITS METHOD AND PROGRAM

This application is the National Phase of PCT/JP2008/065941, filed Sep. 4, 2008, which is based upon and claims the benefit of priority from Japanese patent application No. 2007-233454, filed on Sep. 7, 2007, the disclosure of which is incorporated herein in its entirety by reference.

APPLICABLE FIELD IN THE INDUSTRY

The present invention relates to a radio wave arrival status estimating system, its method, and a program.

BACKGROUND ART

In recent years, a technology capable of improving a transmission speed without increasing a transmission band and a transmission power by employing a plurality of antennas in a transmitter/receiver, which is called MIMO (Multiple-Input Multiple-Output), attracts attention in a radio communication system.

The MIMO is a speed-up technology capable of improving a communication capacity by multiplexing and transmitting different pieces of data from a plurality of transmission antennas, separating this multiplexed signal in a plurality of reception antennas having received the above signal, and extracting the different pieces of data.

Such a signal separation is carried out by utilizing an inverse matrix of a channel matrix having a propagation gain in an antenna pair, which is decided by a combination of each transmission antenna and each reception antenna, as a component. For this, it is desirable from a viewpoint of the signal separation that the propagation gain differs for each antenna pair (that is, it is desirable that a correlation characteristic of the channel matrix is small).

For example, when many paths arrive between the transmission antenna and the reception antenna from various directions, a correlation characteristic of the channel matrix becomes small because a phase relation between the path partners differs for each antenna pair. Thus, a separation characteristic of the signal is improved, and an effect of enlargement of a communication capacity (enlargement of a system capacity) is acquired. From now on, this effect will be described as "an effect of the MIMO" in some cases.

On the other hand, when only one path arrives between the transmission antenna and the reception antenna, a value of the propagation gain becomes identical for each antenna pair, and it becomes difficult to separate the signal. As a result, a sufficient effect of the MIMO becomes difficult to acquire.

As described above, the effect of the MIMO depends upon a radio wave arrival status (a radio wave propagation characteristic) between the transmission antenna and the reception antenna. For this, it is necessary to pre-evaluates the degree of the effect of the MIMO in an introduction area, and appropriately decide an installation position of a base station antenna at the moment of introducing the radio communication system adopting the MIMO. The system for estimating the effect of the MIMO over a computer having an environment of the introduction area simulated therein is employed in order to makes such an antenna installation design.

Conventionally, the following technique exists as a technique of estimating the effect of the MIMO over this computer.

For example, the technology of deriving the effect of the MIMO by employing a ray tracing method is known (Non-patent document 1). Herein, the so-called ray tracing method is a technique in which a radio wave being radiated from an antenna is represented by a number of radio wave lines (rays), and rays that arrive at the reception point are synthesized to obtain a propagation loss and a delay amount on the assumption that each ray is propagated while repeating reflection and transmission geometrically-optically.

Additionally, while the ray tracing method can be classified broadly into a ray launching method and an imaging method, both of these are applicable so far as the technique disclosed in the Non-patent document 1 is concerned.

Herein, the so-called ray launching method is a technique of searching a locus of the ray one by one on the assumption that the ray radiated discretely from the transmission antenna at a constant angle is propagated while repeating the reflection and the transmission in a construction and an object.

Further, the imaging method is a technique for determining a reflection path of the ray, which connects the transmission and reception points, while obtaining a mirror image point for a reflection plane of a transmission path of the ray, which connects the transmission and reception points. The imaging method can realize a higher estimation precision as compared with the ray launching method because it can search the vigorous propagation path of the ray between the transmission point and the reception point. The details of the ray launching method and the imaging method are disclosed, for example, in Non-patent document 2 and Patent document 1 as well.

By the way, in the technique disclosed in the Non-patent document 1, at first, the situation of topography and buildings in the introduction area is simulated, and a propagation path ranging from the transmission antenna to the reception antenna is obtained for each antenna pair by employing the ray tracing method. Next, the channel matrix is obtained from the acquired propagation path, and a propagation loss in a logical path of the MIMO is calculated from an eigenvalue thereof. In addition, SNR (signal-to-Noise Ratio) is calculated for each logical path from the acquired propagation loss, and a throughput at the time of applying the MIMO is calculated based thereupon. And, by comparing the acquired throughput with a throughput in the case of not applying the MIMO, the effect of the MIMO is derived However, with the method of the Non-patent document 1, a problematic point is disclosed in which an arithmetic processing amount at the moment of the calculation becomes enormous, and hence, a processing time is increased. Particularly, in the case of planerly estimating the effect of the MIMO in the evaluation area in the adjacent of the base station antenna, that is, in the case of defining the transmission point and a plurality of the reception points in the adjacent of the transmission point, and estimating the radio wave propagation characteristic between them, or the like, there exists a problem that a time required for the estimation (analysis) becomes enormous.

For example, in the case of obtaining the propagation path ranging from the transmission antenna to the reception antenna by employing the ray launching method, obtaining an accurate propagation path necessitates the estimation that takes the effects such as diffraction and irregular reflection into consideration. However, in the case of performing the ray launching method while taking these effects into consideration, an analysis time is enormously increased as compared with the case that these effects are not taken into consideration. Further, in the case of obtaining the propagation path ranging from the transmission antenna to the reception antenna by employing the imaging method, much analysis time is originally required also when the number of the pairs of the transmission point and the reception time is only one, and besides it, it takes a long time for the analysis all the more in the case of performing the estimation in a planerly area because the analysis with the imaging method have to be performed for a large number of the reception points as well.

Thereupon, the technique of reducing an arithmetic processing amount has been proposed so as to solve such a problematic point (Patent document 1). In the technique of the Patent document 1, the arithmetic processing amount accompanied by the searching of the propagation path of the ray is reduced by reducing the structures that are taken into consideration at the moment of estimating the propagation, or by simplifying a shape of the structure. Specifically, the technique of the Patent document 1 selects and stores buildings in advance that exist in a road and an intersection, in a street microcell in which base stations are arranged on a road and service areas are formed along the road, and performs the propagation estimation by taking only the above buildings into consideration.

However, this technique of the Patent document 1 causes a problem that the estimation precision has to be sacrificed in exchange for a reduction in the arithmetic processing amount because the structures that are taken into consideration are reduced, or a shape of the structure is simplified at the moment of estimating the propagation.

The technique of performing the high-precision propagation estimation while taking the diffraction into consideration without remarkably increasing the arithmetic processing amount has been proposed as a solution to such a problem (Patent document 2). The Patent document 2 discloses the radio wave propagation characteristic estimating system for estimating the propagation characteristic of the radio wave that goes from the transmission point decided within a limited evaluation area up to a plurality of the reception points within the foregoing evaluation area. This radio wave propagation characteristic estimating system includes a non-diffracted wave estimating means for estimating a component other than a diffracted wave out of the components of the radio wave that goes from the transmission point up to the respective reception points, a diffracted wave estimating means for estimating a component of the diffracted wave out of the components of the radio wave that goes from the transmission point up to the respective reception points, and a total radio wave component calculating means for calculating a total radio wave propagation characteristic in the foregoing each reception point while taking an estimated result in the foregoing non-diffracted wave estimating means and an estimated result in the foregoing diffracted wave estimating means into consideration.

The technology of the Patent document 2 described above realizes the high-precision propagation estimation while taking the diffraction into consideration without remarkably increasing the arithmetic processing amount by applying the high-speed and yet high-precision radio wave propagation estimation method for the radio wave propagation estimation of the non-diffracted wave, and employing the radio wave propagation estimation technique of which the arithmetic load is light for the diffracted wave.

Non-patent document 1: K. H. Ng et al. "Efficient Multi-element Ray tracing with Site-Specific Comparisons Using Measured MIMO Channel Data" IEEE Trans. Vehicular Technology, Vol. 56, No. 3, pp. 1019-1032, 2007

Non-patent document 2: Yosio Hosoya (editorial supervision) "Radio Wave Propagation Handbook", REALIZE INC., pp. 234-243, 1999

Patent document 1: JP-P1997-33584A

Patent document 2: JP-P2007-101376A

DISCLOSURE OF THE INVENTION

Problems to be Solved by the Invention

By the way, it has become known that the technology of the Patent document 2 has the following problem. That is, the technology of the Patent document 2 extracts a reception point taking diffraction into consideration (a reception point in which a contribution of the component other than the diffracted wave is supposed to be small, and a contribution of the component of the diffracted wave is supposed to be relatively large) based upon the estimated result in the non-diffracted wave estimating means. And it calculates a total radio wave propagation characteristic at each reception point taking diffraction into consideration. However, the reception points taking diffraction into consideration are increased as the environment comes out in which the structures are numerous, and the diffracted wave is dominant. This leads to an increase in a frequency of the calculation of a total radio wave propagation characteristic that is performed at each reception point, and causes the calculation load to be augmented.

Thereon, the present invention has been accomplished in consideration of the above-mentioned problems, and an object of thereof is provide a technology of realizing the speed-up of the process necessary for estimating the radio wave arrival status while keeping a sufficient precision.

Means to Solve the Problem

The present invention for solving the above-mentioned is a radio wave arrival status estimating system, comprising an estimating means for estimating whether or not a physical characteristic of a radio wave received at a reception point of a radio system to be evaluated has reached a minimum allowable level for determining a characteristic of said radio system, estimating an arrival status of the radio wave at said reception point by applying a first estimation technique of a radio wave propagation status for said reception point when it is estimated that said physical characteristic has reached said minimum allowable level, and estimating an arrival status of the radio wave at said reception point by applying a second estimation technique of a radio wave propagation status for said reception point when it is estimated that said physical characteristic has not reached said minimum allowable level.

Further, the present invention for solving the above-mentioned is a radio wave arrival status estimation method, comprising: estimating whether or not a physical characteristic of a radio wave received at a reception point of a radio system to be evaluated has reached a minimum allowable level for determining a characteristic of said radio system; estimating an arrival status of the radio wave at said reception point by applying a first estimation technique of a radio wave propagation status for said reception point when it is estimated that said physical characteristic has reached said minimum allowable level; and estimating an arrival status of the radio wave at said reception point by applying a second estimation technique of a radio wave propagation status for said reception point when it is estimated that said physical characteristic has not reached said minimum allowable level.

Further, the present invention for solving the above-mentioned is a program for causing an information processing device to execute a process of estimating whether or not a physical characteristic of a radio wave received at a reception point of a radio system to be evaluated has reached a minimum allowable level for determining a characteristic of said radio system, estimating an arrival status of the radio wave at said reception point by applying a first estimation technique of a radio wave propagation status for said reception point when it is estimated that said physical characteristic has reached said minimum allowable level, and estimating an arrival status of the radio wave at said reception point by applying a second estimation technique of a radio wave propagation status for said reception point when it is estimated that said physical characteristic has not reached said minimum allowable level.

An Advantageous Effect of the Invention

The present invention makes it possible to realize the speed-up of the process necessary for estimating the radio wave arrival status while keeping a sufficient precision.

Figure 1:
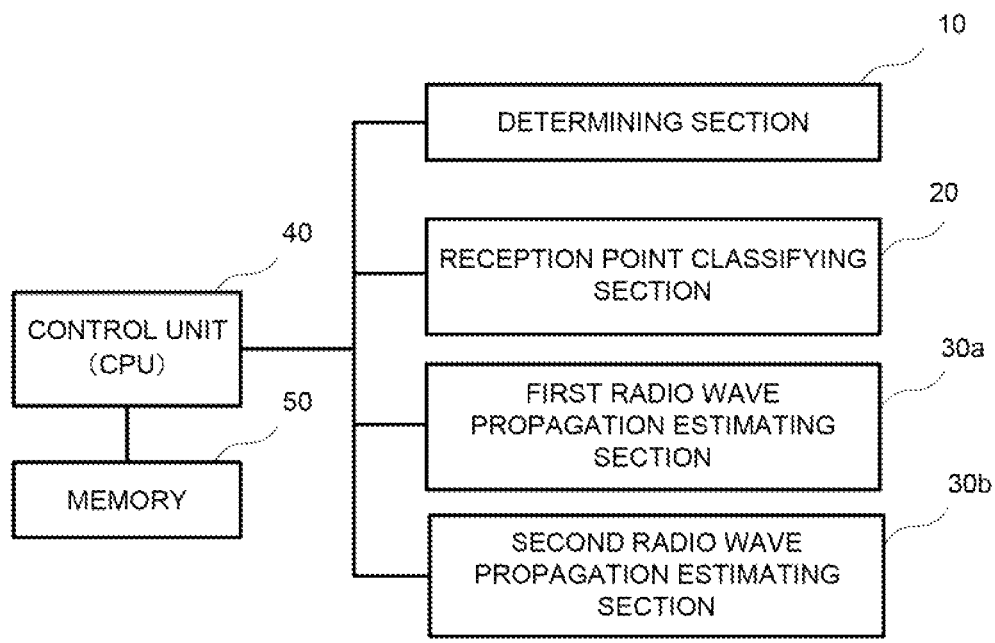
FIG. 1 is a functional block diagram illustrating a first embodiment of the present invention.

DESCRIPTION OF NUMERALS 10 determining section
11 determining section
20 reception point classifying section
21 reception point classifying section
30a first radio wave propagation estimating section
30b second radio wave propagation estimating section
31a first radio wave propagation estimating section
31b second radio wave propagation estimating section
40 control section
50 memory
100 transmission point
111 intensity determining section
200 reception point
300 evaluation area

BEST MODE FOR CARRYING OUT THE INVENTION

A first embodiment of the present invention will be explained by employing a functional block diagram of FIG. 1. Hereinafter, explanation will be made on the assumption that the radio wave arrival status estimating system of this embodiment estimates the propagation state (arrival status) of the radio wave that goes from the transmission point decided within an evaluation area in the radio communication system, being a target of evaluation, up to one reception point or a plurality of reception points within the foregoing evaluation area.

Further, in this embodiment, explanation will be made with the case of paying attention to the effect of the MIMO as a characteristic of the radio system exemplified on the assumption that a physical characteristic of the radio wave received at the reception point is existence or not of an in-view path. Herein, the so-called physical characteristic of the radio wave, which is a characteristic of the radio wave, is an intensity of the received radio wave, existence or not of the in-view path of the received radio wave, an intensity of the main path of the received radio wave, an arrival angle of the received radio wave, a radiation angle of the transmitted radio wave, a delay spread of the received radio wave, etc. While attention is herein paid to "existence or not of the in-view path" as a physical characteristic to which attention is paid, the physical characteristic does not need to be limited according to this example, and attention may be paid to other physical characteristics, for example, an intensity of the received radio wave, an intensity of the main path of the received radio wave, an arrival angle of the received radio wave, a radiation angle of the transmitted radio wave, a delay spread of the received radio wave, etc.

That is, in this embodiment, it is estimated whether or not the in-view path exists at the reception point, and it is estimated that the physical characteristic of the radio wave received at the reception point of the radio communication system has reached a minimum allowable level for determining the characteristic of the radio communication system when no in-view path exists. On the other hand, when the in-view path exists, it is to be estimated that the physical characteristic of the received radio wave has not reached a minimum allowable level for determining the characteristic of the radio communication system.

Herein, the so-called "minimum allowable level for determining the characteristic of the radio communication system (radio system)" is a least necessary level of the physical characteristic being employed for determining whether the characteristic of the radio communication system is good or bad. Well, with regard to a specific criteria of this "minimum allowable level", for example, the criteria of "the minimum allowable level" is "existence or not of the in-view path" when it is assumed that the physical characteristic is "existence or not of the in-view path" as is the case of this embodiment.

Further, when the physical characteristic is "an intensity of the radio wave", the criteria of "the minimum allowable level" differs depending upon a propagation environment, the characteristic of the radio communication system, being an target of evaluation, or the like, and empirically, the intensity of the radio wave received at the reception point is a radio wave intensity higher by 10 db to 30 db or so than the minimum radio wave intensity at which the communication can be made in the radio communication system.

Further, when the physical characteristic is "an intensity of the main path", the criteria of "the minimum allowable level" differs depending upon the propagation environment, the characteristic of the radio communication system, being an target of evaluation, or the like, and empirically, the intensity in the main path of the radio wave received at the reception point is a radio wave intensity of the main path higher by 10 db to 30 db or so than the minimum radio wave intensity at which the communication can be made in the radio communication system.

Further, when the physical characteristic is "an arrival angle", the criteria of "the minimum allowable level" differs depending upon the propagation environment, the characteristic of the radio communication system, being an target of evaluation, or the like, and empirically, it is an arrival angle of which a standard deviation of the arrival angle spread at the reception point is 20-90 degree or so.

Further, when the physical characteristic is "an radiation angle", the criteria of "the minimum allowable level" is a radiation angle of which a standard deviation of the radiation angle at the transmission point is 20-90 degree or so.

Further, when the physical characteristic is "a delay spread", the criteria of "the minimum allowable level" differs depending upon the propagation environment and the characteristic of the radio communication system, and empirically, it is a delay spread of which a standard deviation of the delay spread at the reception point is 10 ns-1000 ns or so.

By the way, the radio wave propagation characteristic estimating system of this embodiment includes and is configured of a determining section 10, a reception point classifying section 20, a first radio wave propagation estimating section 30a, a second radio wave propagation estimating section 30b, a control section 40, and a memory 50 as shown in FIG. 1.

The determining section 10 estimates an in-view state between the transmission point and the reception point of the radio wave. Herein, the so-called,"in-view state" is a state indicating whether a shield or something like it that intercepts the radio wave transmitted from the transmission point exists between the transmission point and the reception point. That is, when no shield exists between the transmission point and the reception point, it indicates the state in which the reception point is viewable from the transmission point (in view), and when the shield exists, it indicates the state in which the reception point is not viewable from the transmission point (out of view).

Specifically, the determining section 10 investigates whether or not the shield of the radio wave exists on a line connecting the transmission point and the reception point. And, when the shield exists, the above reception point is a reception point in which the effect of the MIMO can be expected almost without exception, and it is estimated that the minimum allowable level for determining the characteristic of the radio communication system has been reached. On the other hand, when no shield exists, the many reception points are points in which the effect of the MIMO cannot be expected, and it is estimated that the minimum allowable level for determining the characteristic of the radio communication system has not been reached. The reason why such estimation is performed is that when the shield of the radio wave exists on a line connecting the transmission point and the reception point, it can be expected that the paths arrive at the above reception point from various directions, or an effect of improving the reception power due to reception diversity can be expected. Additionally, hereinafter, "the minimum allowable level of the radio communication system" is described as "an allowable level" in some cases.

Further, the so-called "shield" in this embodiment signifies a structure/topography or something like it that intercepts the radio wave transmitted from the transmission point. The structure/topography etc. that does not intercept the radio wave is not called "a shield" herein even though it exists on a line connecting the transmission point and the reception point. Additionally, in the radio wave arrival status estimating system of the present invention, the situation of the environment of the topography, the building, etc. associated with the target area into which the MIMO is introduced has to be pre-simulated over the computer as a preparation, and at that moment, three-dimensional data (information such as a height, a width, and a depth) associated with the land/structure etc. is acquired in advance. Making a reference to this three-dimensional data makes it possible to investigate whether "the shield" or the something like it that intercepts the radio wave exits on a line connecting the transmission point and the reception point. Well, with regard to a specific method thereof, for example, the method is thinkable of simulating each coordinate of the transmission point, the reception point, and apexes of the structure over a three-dimensional spatial axis of coordinates, and investigating whether a line connecting the transmission point and the reception point intersects the structure.

The reception point classifying section 20 classifies a plurality of the reception points into a group of the reception points determined to be out of view (group A) and a group of the reception points determined to be in view (group B) based upon a determination result by the determining section 10.

The first radio wave propagation estimating section 30a estimates the radio wave propagation characteristic by employing the technique of statistically estimating the radio wave propagation.

The second radio wave propagation estimating section 30b estimates the radio wave propagation characteristic by employing the technique of deterministically estimating the radio wave propagation.

Herein, the foregoing statistic estimation technique of the radio wave propagation and deterministic estimation technique of the radio wave propagation will be briefly explained.

The radio wave propagation simulation can be classified broadly into one by the statistic technique and one by the deterministic technique. The statistic technique is a technique of giving an estimation equation of a propagation power loss (hereinafter, simply referred to as a propagation loss) having a distance, a frequency, etc. as an argument and statistically deciding parameters thereof based upon a large number of pieces of data acquired in an actual measurement of the propagation loss at the moment of deciding them. On the other hand, the deterministic technique is a technique of pre-simulating the propagation environment (the shield exerting an influence upon the propagation of the radio wave, for example, the structure and the object) that is estimated over the computer, deterministically calculating an influence that the radio wave radiated from the antenna receives from these structure and object, and estimating the radio wave status at the reception point. In such a manner, the deterministic technique being employed in the second radio wave propagation estimating section 30b is inferior to the statistic method being employed in the first radio wave propagation estimating section 30a from a viewpoint of the arithmetic processing amount because the arithmetic processing amount becomes much. However, the deterministic technique being employed in the second radio wave propagation estimating section 30b is higher in a precision of the estimation because of deterministically taking an influence of the propagation environment into consideration.

The control section 40 is CPU for controlling each of the configuration sections 10 to 30a, and 30b described above.

The memory 50 functions as a working memory of CPU. This memory 50 has a table (not shown in the figure). The reception points group-divided by the reception point classifying section 20 are stored group by group in this table.

Next, an operation of the radio wave propagation characteristic estimating system configured as mentioned above will be explained by employing FIG. 3 and FIG. 5.

Figure 3:
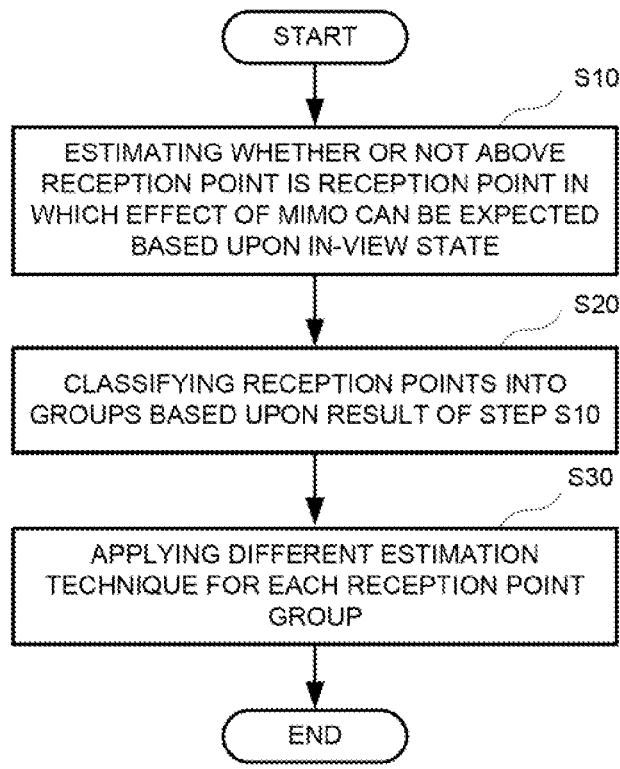
FIG. 3 is a flowchart in the first embodiment of the present invention.
Figure 5:
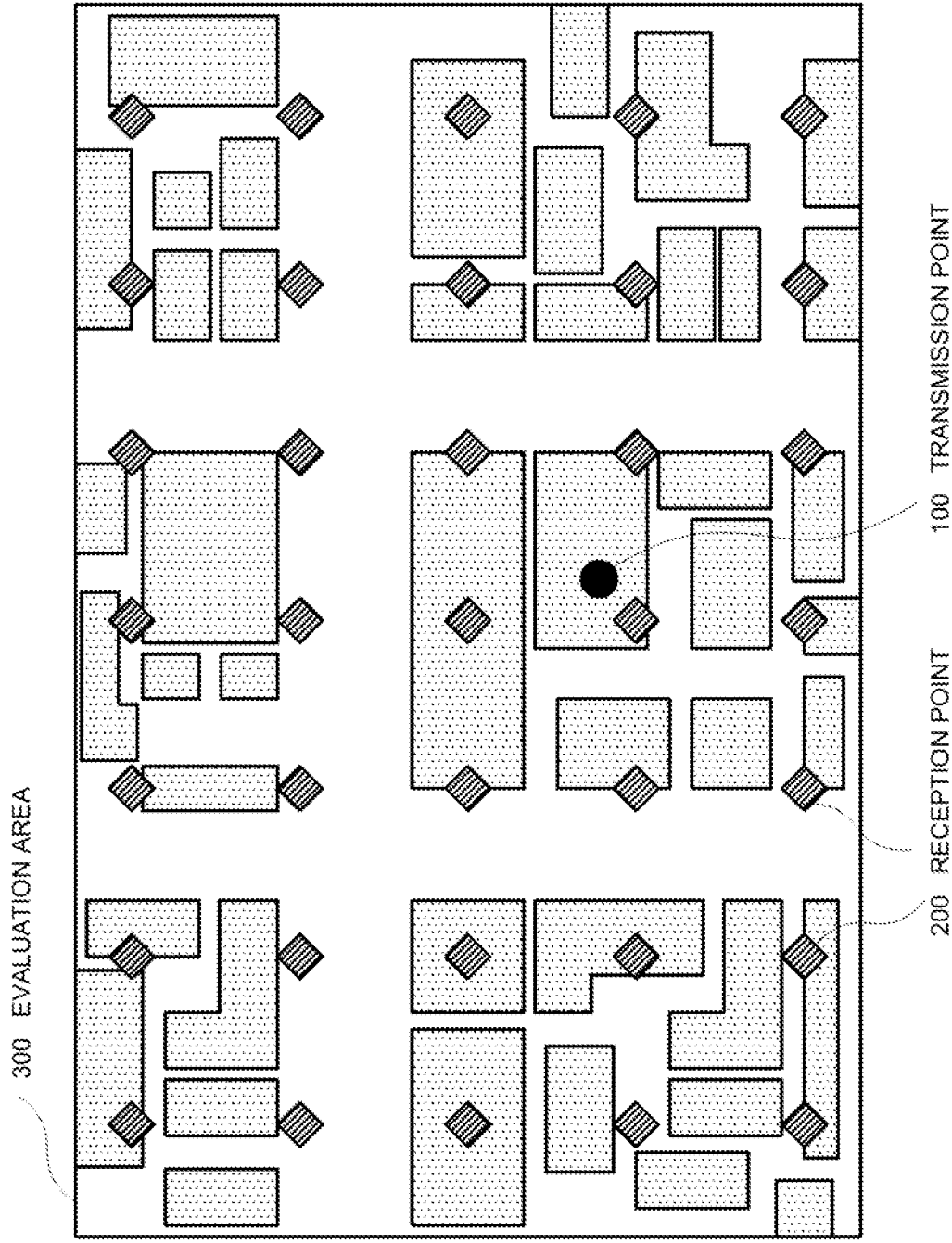
FIG. 5 is a view for explaining an operation of the embodiments of the present invention.

FIG. 3 is a flowchart illustrating an operation of this embodiment, and FIG. 5 is a view for explaining an operation of the embodiments of the present invention. As shown in FIG. 5, it is assumed that a ground (a white background part) exists within an evaluation area 300, and a plurality of the buildings (polygons having striking points affixed therein) having three-dimensional apex information are arranged thereupon. Further, it is assumed that a transmission point 100 (black circle) is arranged on a roof top of the building, and a plurality of reception points 200 (diamonds with oblique lines) are fixed at position higher by a constant than the ground.

Additionally, hereinafter, explanation will be made with the case of estimating the radio wave arrival status (radio wave propagation characteristic) exemplified for a purpose of estimating "the effect of the MIMO" at the moment of introducing the radio communication system adopting the MIMO. However, the estimation does not need to be limited to this example, and a scheme of employing this system for the evaluation of the communication characteristic other than the MIMO is also acceptable. Also in that case, it is possible to realize the speed-up of the process necessary for estimating the radio wave arrival status while keeping a sufficient precision.

Further, while in the following, explanation is made with the case that the reception points exist in plural exemplified, it does not matter that the number of the reception points is only one.

It is necessary to simulate the situation of the environment of the topography, the buildings, etc. in the introduction area over the computer as a preparation.

Well, the determining section 10 estimates whether or not the reception point of the transmitted radio wave is a reception point in which the effect of the MIMO can be expected based upon the in-view state between the transmission point and the reception point of the radio wave. Specifically, the determining section 10 investigates whether or not the shield of the radio wave exists on a line connecting the transmission point 100 and each reception point 200, and when no shield exists, that is, when the reception point is in view upon seen from the transmission point 100, the determining section 10 can estimate that the many reception points are reception points in which the effect of the MIMO cannot be expected. On the other hand, when the shield exists, that is, when the reception point is out of view upon seen from the transmission point 100, the determining section 10 estimates that many reception points are points in which the effect of the MIMO can be expected almost without exception (step S10).

Next, the reception point classifying section 20 classifies the reception point determined to be in view in the step S10 (that is, the reception point estimated to be a point in which the effect of the MIMO cannot be expected sufficiently) into a group B. In addition, the reception point classifying section 20 classifies the reception point determined to be out of view in the step S10 (that is, the reception point estimated to be a point in which the effect of the MIMO can be expected almost without exception) into a group A (step S20).

Continuously, the estimation technique in the first radio wave propagation estimating section 30a is applied for the reception points belonging to the group A, and the effect of the MIMO is statistically estimated. Herein, with regard to the specific estimation technique in the first radio wave propagation estimating section 30a, the models that are acquired by performing a statistic process for a measurement result, for example, an Okumura model and a Hata model are employed.

Further, the estimation technique in the second radio wave propagation estimating section 30b is applied for the reception points belonging to the group B, and the effect of the MIMO is deterministically estimated (step S30). Herein, it is desirable that the specific estimation technique in the second radio wave propagation estimating section 30b is a technique that differs from that of the first radio wave propagation estimating section 30a, and yet is higher in a precision than that of the first radio wave propagation estimating section 30a. Specifically, for example, the ray launching method is employed. The imaging method may be employed so far as the deterministic radio wave propagation estimation technique is concerned.

With the steps S10 to S30 mentioned above, the arrival status of the radio wave that goes from the transmission point 100 up to each reception point 200 is estimated.

As mentioned above, this embodiment makes it possible to realize the speed-up of the process necessary for estimating the radio wave arrival status while keeping a sufficient precision. The reason is that the radio wave arrival status estimating system of the present invention makes it possible to estimate whether or not the physical characteristic of the radio wave received at the reception point of the radio system, being a target of evaluation, has reached the minimum allowable level of the above radio communication system, and to estimate the arrival status of the radio wave by applying the optimum estimation technique responding to its estimation result.

Further, the above-mentioned first embodiment group-divides a plurality of the reception points within the evaluation area into the reception points in which the effect of the MIMO cannot be acquired sufficiently, and the reception points in which the effect of the MIMO can be expected almost without exception, applies the radio wave propagation estimation technique of which the precision is high for the former, and applies the radio wave propagation estimation technique of which the precision and the arithmetic load is low and light, respectively, for the latter. That is, with this, the reception points that are subjected to the estimation method of which the precision and the arithmetic amount is high and much, respectively, can be narrowed down to a reception point that is worthy of being subjected to the truly detailed estimation technique. Thus, it is possible to reduce the arithmetic processing amount while keeping a sufficient precision at the moment of estimating the radio wave arrival status. In particular, the time required for estimating "the effect of the MIMO" can be shortened.

Further, in this embodiment, it is possible to reduce the arithmetic processing amount and to shorten the time required for estimating the radio wave arrival status also in the case of estimating the radio wave arrival status under the environment in which a ratio at which the diffracted wave occupies is high because the complicated arithmetic operation such as the synthesis calculation of the radio wave components that is performed for each reception point does not need to be performed.

By the way, in the above-mentioned first embodiment, the deterministic technique having the high precision was applied for the reception point estimated to be a point in which the effect of the MIMO was not able to be expected, and the statistic technique having the low arithmetic load was applied for the reception point estimated to be a point in which the effect of the MIMO was able to be expected. However, the estimation does not need to be limited to this example, and the optimum technique can be applied responding to the purpose and the environment. For example, when much importance is attached to the estimation precision than the processing time, the techniques being applied may be reversed differently from an example of the above-mentioned embodiment. That is, a configuration may be made so that the deterministic technique having the high precision is applied for the reception point estimated to be a point in which the effect of the MIMO can be expected, and the statistic technique having the light arithmetic load is applied for the reception point estimated to be a point in which the effect of the MIMO cannot be expected. In such a case, it becomes possible to more accurately estimate the area in which the effect of the MIMO is acquired.

Additionally, while in the above-mentioned first embodiment, attention was paid to existence or not of the in-view path as a physical characteristic of the radio wave received at the reception point, the physical characteristic does not need to be limited hereto. Attention is paid to an intensity of the received radio wave as a physical characteristic, and a configuration may be made so as to estimate whether or not the intensity of this received radio wave has reached the minimum allowable level of the radio communication system.

Figure 2:
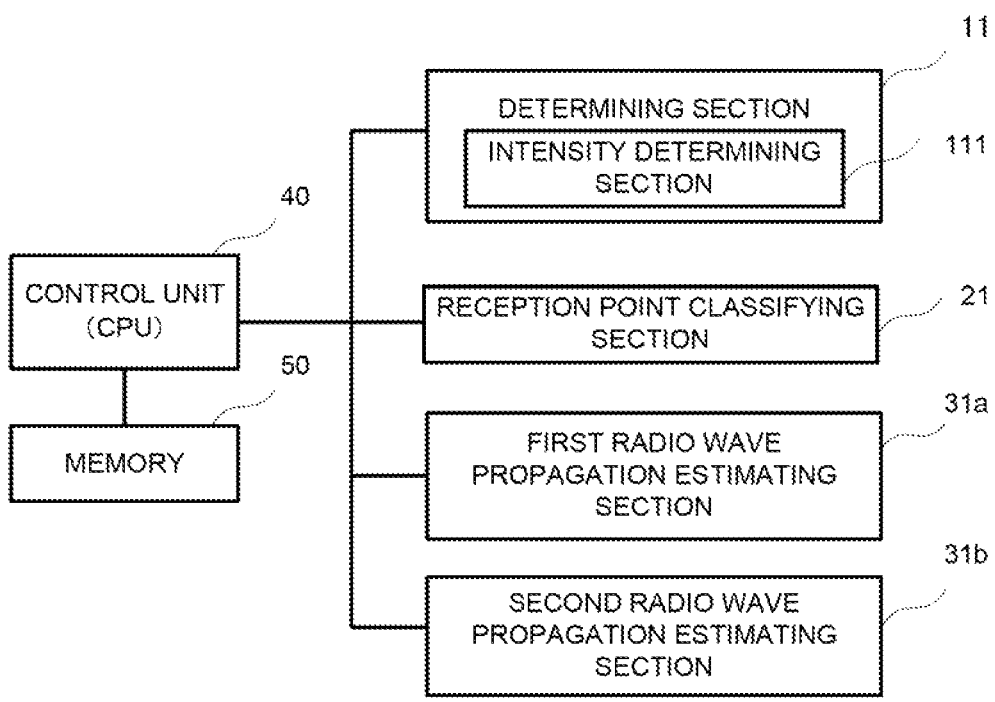
FIG. 2 is a functional block diagram illustrating a second embodiment of the present invention.

Next, the second embodiment will be explained by employing a functional block diagram of FIG. 2.

In the second embodiment, explanation will be made with the case of paying attention to the effect of the MIMO as a characteristic of the radio system exemplified on the assumption that the physical characteristic of the radio wave received at the reception point is an intensity of the main path at the reception point. Herein, the so-called main path is a path in which an arrival of the strong radio wave component is observed, out of a plurality of the paths from the transmission point to the reception point of the radio wave. That is, this embodiment estimates whether or not the intensity of the main path is larger than a pre-decided threshold, and estimates that the physical characteristic of the radio wave received at the reception point of the radio communication system has not reached the minimum allowable level for determining the characteristic of the radio communication system when the intensity of the main path is larger than the pre-decided threshold. On the other hand, when the intensity of the main path is smaller than the pre-decided threshold, it is to be estimated that the physical characteristic has reached the minimum allowable level for determining the characteristic of the radio communication system.

By the way, the radio wave arrival status estimating system of this embodiment includes and is configured of a determining section 11, a reception point classifying section 21, a first radio wave propagation estimating section 31*a*, a second radio wave propagation estimating section 31*b*, a control section 40, and a memory 50.

The determining section 11 further includes an intensity determining section 111. The intensity determining section 111 estimates the intensity of the radio wave received at the reception point by employing the simplified estimation technique obtained by adding a limit to the ray tracing method that is usually employed. While the details associated with this "limitation" will be described later, the processing time can be shortened as compared with the case of applying the usual ray tracing method because addition of the limit enables the arithmetic process to be wound up in a halfway. Additionally, so far as the simplified estimation technique is concerned, a scheme of employing the estimation technique obtained by adding a limit to the estimation technique other than the ray tracing method is also acceptable.

The determining section 11 compares the intensity of the main path at the reception point with a pre-decided threshold of the intensity based upon a result of the estimation performed by the intensity determining section 111. The determining section 11 estimates that the intensity of the main path at the reception point has not reached the allowable level when the intensity of the main path estimated by the intensity determining section 111 exceeds the threshold. On the other hand, when the intensity of the main path estimated by the intensity determining section III does not satisfy the threshold, it is estimated that the intensity of the radio wave received at the reception point has reached the allowable level.

Functions of the other configuration sections are identical to that of the first embodiment, so detailed explanation thereof is omitted.

Figure 4:
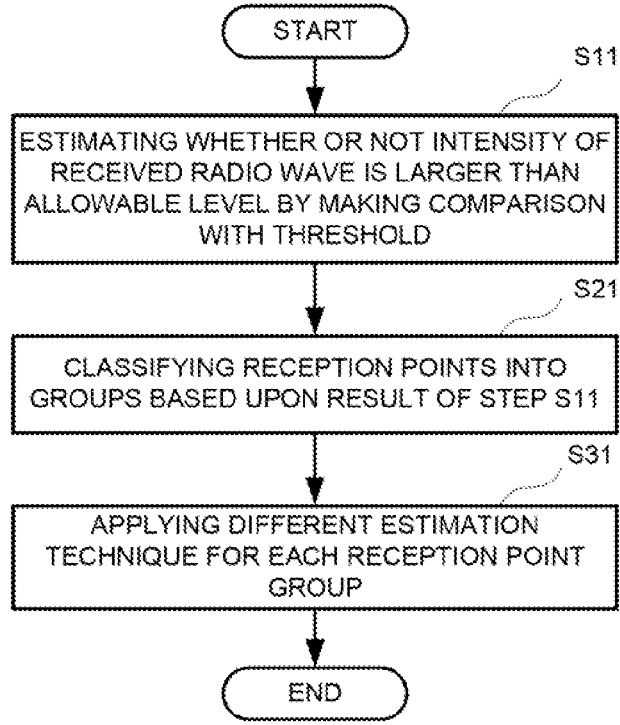
FIG. 4 is a flowchart in the second embodiment of the present invention.

Next, an operation of the radio wave propagation characteristic estimating system in the second embodiment configured as mentioned above will be explained by employing a flowchart of FIG. 4.

At first, the intensity determining section 111 estimates the propagation characteristic of the radio wave that goes from the transmission point 100 up to each reception point 200, and estimates the intensity of the main path at each reception point 200. At this time, the intensity determining section 111 employs the simplified estimation technique obtained by adding a limit to the deterministic radio wave propagation estimation technique such as the ray launching method and the imaging method. Specifically, herein, the ray tracing method is employed in which "a limit of not taking the diffraction and the irregular reflection into consideration" out of the reflection, the transmission, the diffraction, and the irregular reflection as a physical phenomenon that becomes a target of the ray searching, and "a limit of making magnitude of the propagation loss, which becomes a condition for terminating the searching in the ray searching, smaller than magnitude of an allowable propagation loss of the radio communication system, which becomes a target of calculation, have been added.

Additionally, the limit being herein added does not need to be limited to the above-mentioned example. So far as the ray tracing method in which a limit of not taking at least one physical phenomenon into consideration, out of the reflection, the transmission, the diffraction, and the irregular reflection, as a physical phenomenon that becomes a target of the ray searching, and a limit of making magnitude of the propagation loss, which becomes a condition for terminating the searching in the ray searching, smaller than magnitude of an allowable propagation loss of the radio communication system, which becomes a target of calculation, have been added, a configuration may be made so that the radio wave components other than the diffraction/irregular reflection is not taken into consideration. However, from a viewpoint of shortening the processing time, it is preferable to simplify the arithmetic operation by adding many limits if possible.

The determining section 11 compares the intensity of the main path at the reception point with a pre-decided threshold of the intensity based upon a result of the estimation performed by the intensity determining section III, thereby to estimate whether or not the intensity of the main path at the reception point is larger than the allowable level (herein, the intensity set to the threshold) (step S11).

Next, the reception point classifying section 21 classifies the reception point estimated to be a point in which the intensity of the main path is larger than the threshold through the step S11 (that is, the reception point estimated to be a point in which the effect of the MIMO cannot be expected sufficiently) into the group B. In addition, the reception point classifying section 21 classifies the reception point estimated to be a point in which the intensity of the received radio wave is smaller than the threshold through the step S11 (that is, the reception point estimated to be a point in which the effect of the MIMO can be expected almost without exception) into the group A (step S21).

Continuously, the first radio wave propagation estimating section 31*a* is applied for the reception points belonging to the group A, and the radio wave arrival status is estimated. Further, the second radio wave propagation estimating section 31*b* is applied for the reception points belonging to the group B, and the radio wave arrival status is estimated (step S31). Herein, the estimation technique of the second radio wave propagation estimating section 31*b* is an estimation technique different from that of the first radio wave propagation estimating section 31*a*. Specifically, the estimation technique of the first radio wave propagation estimating section 31*a* is a statistic estimation technique of which the arithmetic processing amount and the arithmetic load are smaller and lighter than that of the estimation technique of the second radio wave propagation estimating section 31*b*, respectively. For example, it is a technique such as an Okumura model and a Hata model that are acquired by performing a statistic process for a measurement result.

Additionally, both of the estimation technique by the intensity determining section 111 and the estimation technique of the first radio wave propagation estimating section 31*a* are identical to the ray tracing method, so the there is a possibility that the calculation result having an identical content is obtained repeatedly. In such a case, the process becomes redundant and wastefulness is generated. For this, from a viewpoint of efficiency of the process, it is desirable to cause the first radio wave propagation estimating section 31*a* to take over the arithmetic result by the intensity determining section 111, and to perform the arithmetic operation for it. That is, it is preferable to cause the first radio wave propagation estimating section 31*a* to utilize a result of the arithmetic operation performed by the intensity determining section 111 in the step S11 at the moment of estimating the radio wave arrival status by applying the first radio wave propagation estimating section 31*a* for the reception points belonging to the group A. For example, with this embodiment, it is good enough to cause the first radio wave propagation estimating section 31*a* to continuously perform the arithmetic operation, which takes the diffraction and the irregular reflection into consideration, in the step S31 because "a limit of not taking the diffraction and the irregular reflection into consideration" has been added.

Further, needless to say, it does not matter that in the step S31, the estimation technique by the intensity determining section 111 is applied for the reception points belonging to the group A instead of applying the first radio wave propagation estimating section 31*a*.

With the steps S11 to S31, the arrival status of the radio wave that goes from the transmission point 100 up to each reception point 200 is estimated.

In the above-mentioned second embodiment, if only the strength of the main path at the reception point exceeds the threshold, the above reception point is classified into the group B. For example, setting the threshold to a small value leads to an increase in the reception points that are classified into the group B. As a result, the number of the reception points (that is, the reception points belong to the group B) that are estimated not to reach the allowable level is increased as compared with the case of the first embodiment. That is, resultantly, the targeted reception points for which the estimation technique having the high precision is applied are increased. The reason is that, notwithstanding the reception points each estimated to be a reception point in which the effect of the MIMO can be acquired because of being out of view in the first embodiment, as a matter of fact, some of them are reception points in which the intensity of the main path is high and the effect of the MIMO cannot be acquired sufficiently, and these reception points are classified into the group B in the second embodiment. Thus, the time required for estimating the radio wave arrival status is shortened as compared with the conventional case, and the estimation thereof can be performed at a precision higher than that of the first embodiment.

Additionally, in the above-mentioned first to second embodiments, each part of the apparatus was configured with hardware; however a configuration can be made so as to cause an information processing device to partially or wholly execute a process of each part as a program.

As mentioned above, the embodiments were explained, and examples of the present invention are described below.

The 1st embodiment of the present invention is characterized in that a radio wave arrival status estimating system, comprising an estimating means for estimating whether or not a physical characteristic of a radio wave received at a reception point of a radio system to be evaluated has reached a minimum allowable level for determining a characteristic of said radio system, estimating an arrival status of the radio wave at said reception point by applying a first estimation technique of a radio wave propagation status for said reception point when it is estimated that said physical characteristic has reached said minimum allowable level, and estimating an arrival status of the radio wave at said reception point by applying a second estimation technique of a radio wave propagation status for said reception point when it is estimated that said physical characteristic has not reached said minimum allowable level.

Furthermore, the 2nd embodiment of the present invention is characterized in that, in the above-mentioned 1st embodiments, said physical characteristic is at least one of an intensity of the radio wave received at the reception point, existence or not of an in-view path, an intensity of a main path, an arrival angle, a radiation angle, and a delay spread.

Furthermore, the 3rd embodiment of the present invention is characterized in that, in the above-mentioned 1st or 2nd embodiments, when a characteristic of said radio system is an effect of MIMO, said estimating means is configured so that it investigates whether or not a shield of the radio wave exists on a line connecting a transmission point and the reception point of the radio wave transmitted from this transmission point, estimates that the minimum allowable level for determining the effect of the MIMO has been reached when the shield exists, and estimates that the minimum allowable level for determining the effect of the MIMO has not been reached when no shield exists.

Furthermore, the 4th embodiment of the present invention is characterized in that, in the above-mentioned 1st or 2nd embodiments, when a characteristic of said radio system is an effect of MIMO, said estimating means is configured so that it investigates whether or not the intensity of the main path of the radio wave received at the reception point is larger than a pre-decided threshold, estimates that the intensity of said main path has reached the minimum allowable level for determining the effect of the MIMO when it is smaller than said threshold, and estimates that the intensity of said main path has not reached the minimum allowable level for determining the effect of the MIMO when it is larger than said threshold.

Furthermore, the 5th embodiment of the present invention is characterized in that, in any one of the above-mentioned 1st to 4th embodiments, said second estimation technique of the radio wave propagation status is a technique of which a precision is higher than that of said first estimation technique of the radio wave propagation status.

Furthermore, the 6th embodiment of the present invention is characterized in that, in any one of the above-mentioned 1st to 5th embodiments, said first estimation technique of the radio wave propagation status is a statistic estimation technique, and said second estimation technique of the radio wave propagation status is a deterministic estimation technique.

Furthermore, the 7th embodiment of the present invention is characterized in that, in any one of the above-mentioned 1st to 6th embodiments, a ray tracing method is employed as a technique of estimating whether or not the physical characteristic of the radio wave received at said reception point has reached said minimum allowable level.

Furthermore, the 8th embodiment of the present invention is characterized in that, the above-mentioned 7th embodiment, in said ray tracing method, at least one or more of a limit of not taking at least one physical phenomenon, out of reflection, transmission, diffraction, and irregular reflection, into consideration as a physical phenomenon that becomes a target of searching, and a limit of making magnitude of a propagation loss, which becomes a condition for terminating the searching in the ray searching, smaller than magnitude of an allowable propagation loss of the radio system are added.

Furthermore, the 9th embodiment of the present invention is characterized in that a radio wave arrival status estimation method, comprising: estimating whether or not a physical characteristic of a radio wave received at a reception point of a radio system to be evaluated has reached a minimum allowable level for determining a characteristic of said radio system; estimating an arrival status of the radio wave at said reception point by applying a first estimation technique of a radio wave propagation status for said reception point when it is estimated that said physical characteristic has reached said minimum allowable level; and estimating an arrival status of the radio wave at said reception point by applying a second estimation technique of a radio wave propagation status for said reception point when it is estimated that said physical characteristic has not reached said minimum allowable level.

Furthermore, the 10th embodiment of the present invention is characterized in that, the above-mentioned 9th embodiment, said physical characteristic is at least one of an intensity of the radio wave received at the reception point, existence or not of an in-view path, an intensity of a main path, an arrival angle, a radiation angle, and a delay spread.

Furthermore, the 11th embodiment of the present invention is characterized in that, in the above-mentioned 9th or 10th embodiments, said method comprising: when a characteristic of said radio system is an effect of MIMO, investigating whether or not a shield of the radio wave exists on a line connecting a transmission point and the reception point of the radio wave transmitted from this transmission point; estimating that the minimum allowable level for determining the effect of the MIMO has been reached when the shield exists; and estimating that the minimum allowable level for determining the effect of the MIMO has not been reached when no shield exists.

Furthermore, the 12th embodiment of the present invention is characterized in that, in the above-mentioned 9th or 10th embodiments, said method comprising: when a characteristic of said radio system is an effect of MIMO, investigating whether or not the intensity of the main path of the radio wave received at the reception point is larger than a pre-decided threshold; estimating that the intensity of said main path has reached the minimum allowable level for determining the effect of the MIMO when it is smaller than said threshold; and estimating that the intensity of said main path has not reached the minimum allowable level for determining the effect of the MIMO when it is larger than said threshold.

Furthermore, the 13th embodiment of the present invention is characterized in that, in any one of the above-mentioned 9th to 12th embodiments, said second estimation technique of the radio wave propagation status is a technique of which a precision is higher than that of said first estimation technique of the radio wave propagation status.

Furthermore, the 14th embodiment of the present invention is characterized in that, in any one of the above-mentioned 9th to 13th embodiments, said first estimation technique of the radio wave propagation status is a statistic estimation technique, and said second estimation technique of the radio wave propagation status is a deterministic estimation technique.

Furthermore, the 15th embodiment of the present invention is characterized in that, in any one of the above-mentioned 9th to 14th embodiments, a ray tracing method is employed as a technique of estimating whether or not the physical characteristic of the radio wave received at said reception point has reached said minimum allowable level.

Furthermore, the 16th embodiment of the present invention is characterized in that, in the above-mentioned 15th embodiment, in said ray tracing method, at least one or more of a limit of not taking at least one physical phenomenon, out of reflection, transmission, diffraction, and irregular reflection, into consideration as a physical phenomenon that becomes a target of searching, and a limit of making magnitude of a propagation loss, which becomes a condition for terminating the searching in the ray searching, smaller than magnitude of an allowable propagation loss of the radio system are added.

Furthermore, the 17th embodiment of the present invention is characterized in that a program for causing an information processing device to execute a process of estimating whether or not a physical characteristic of a radio wave received at a reception point of a radio system to be evaluated has reached a minimum allowable level for determining a characteristic of said radio system, estimating an arrival status of the radio wave at said reception point by applying a first estimation technique of a radio wave propagation status for said reception point when it is estimated that said physical characteristic has reached said minimum allowable level, and estimating an arrival status of the radio wave at said reception point by applying a second estimation technique of a radio wave propagation status for said reception point when it is estimated that said physical characteristic has not reached said minimum allowable level.

[How the Invention is Capable of Industrial Exploitation]

The present invention is applicable to an application of the high-speed and yet high-precision estimation of the radio wave propagation characteristic that aims for supporting an arrangement of base stations, parent machines, etc. in the radio communication system adopting the MIMO such as a mobile telephone and a wireless LAN, or the like.

The invention claimed is:
1. A radio wave arrival status estimating system, comprising:
　a reception point of a radio system for receiving line of sight and reflected radio waves;
　a determining unit that, by a deterministic estimation technique, determines for each radio wave whether or not an intensity of the main path of the radio wave to be evaluated is larger than a pre-decided threshold, estimates that a propagation characteristic of the radio wave has reached a minimum allowable level when the intensity of said main path is smaller than said threshold, and estimates that it has not reached the minimum allowable level when the intensity of said main path is larger than said threshold, and
　an estimator that estimates an arrival status of the radio wave at said reception point by applying a first estimation technique of a radio wave propagation status for the reception point at which it is estimated that said minimum allowable level has been reached, and estimates an arrival status of the radio wave at said reception point by applying a second estimation technique of a radio wave propagation status, being a technique of which a precision is higher than that of said first estimation technique of the radio wave propagation status, for the reception point at which it is estimated that said minimum allowable level has not been reached;

wherein said deterministic estimation technique is a ray tracing process that considers some but not all of reflection, transmission, diffraction, and irregular reflection of the radio wave in estimating the propagation characteristic of the radio wave, the propagation characteristic being associated with which of the reflection, the transmission, and the irregular reflection are considered by said deterministic estimation technique, wherein the ray tracing process is terminated when a propagation loss of the some but not all of the reflection, the transmission, the diffraction, and the reflection that are considered is less than wherein an allowable propagation loss of a radio system, and said propagation characteristic includes at least one of an intensity of the radio waves received at the reception point, existence or not of the line of sight radio wave, an intensity of a main path, an arrival angle, a radiation angle, and a delay spread.

2. A radio wave arrival status estimating system according to claim 1, wherein said estimator investigates whether or not a shield of the radio wave exists on a line connecting a transmission point and the reception point of the radio wave transmitted from this transmission point, estimates that said minimum allowable level has been reached when the shield exists, and estimates that said minimum allowable level has not been reached when no shield exists.

3. A radio wave arrival status estimating system according to claim 1, wherein said first estimation technique of the radio wave propagation status is a statistic estimation technique, and said second estimation technique of the radio wave propagation status is a deterministic estimation technique.

4. A radio wave arrival status estimating system according to claim 1, wherein a ray tracing method is employed as a technique of estimating whether or not the propagation characteristic of the radio wave received at said reception point has reached said minimum allowable level.

5. A radio wave arrival status estimating system according to claim 4, wherein in said ray tracing method, at least one or more of a limit of not taking at least one propagation characteristic, out of reflection, transmission, diffraction, and irregular reflection, into consideration as a propagation characteristic that becomes a target of searching, and a limit of making magnitude of a propagation loss, which becomes a condition for terminating the searching in the ray searching, smaller than magnitude of an allowable propagation loss of the radio system are added.

6. A radio wave arrival status estimation method, comprising:

receiving, at a reception point of a radio system, line of sight and reflected radio waves;

determining for each radio wave, by a deterministic estimation technique, whether or not an intensity of the main path of the radio wave to be evaluated is larger than a pre-decided threshold;

estimating that a propagation characteristic of the radio wave has reached a minimum allowable level when the intensity of said main path is smaller than said threshold;

estimating that it has not reached the minimum allowable level when the intensity of said main path is larger than said threshold;

estimating an arrival status of the radio wave at said reception point by applying a first estimation technique of a radio wave propagation status for the reception point at which it is estimated that said minimum allowable level has been reached; and estimating an arrival status of the radio wave at said reception point by applying a second estimation technique of a radio wave propagation status, being a technique of which a precision is higher than that of said first estimation technique of the radio wave propagation status, for the reception point at which it is estimated that said minimum allowable level has not been reached, wherein said deterministic estimation technique is a ray tracing process that considers some but not all of reflection, transmission, diffraction, and irregular reflection of the radio wave in estimating the propagation characteristic of the radio wave, the propagation characteristic being associated with which of the reflection, the transmission, and the irregular reflection are considered by said deterministic estimation technique, wherein the ray tracing process is terminated when a propagation loss of the some but not all of the reflection, the transmission, the diffraction, and the reflection that are considered is less than an allowable propagation loss of a radio system, and said propagation characteristic includes at least one of an intensity of the radio waves received at the reception point, existence or not of an the line of sight radio wave, an intensity of a main path, an arrival angle, a radiation angle, and a delay spread.

7. A radio wave arrival status estimation method according to claim 6, said method comprising: investigating whether or not a shield of the radio wave exists on a line connecting a transmission point and the reception point of the radio wave transmitted from this transmission point; estimating that said minimum allowable level has been reached when the shield exists; and estimating that said minimum allowable level has not been reached when no shield exists.

8. A radio wave arrival status estimation method according to claim 6, wherein said first estimation technique of the radio wave propagation status is a statistic estimation technique, and said second estimation technique of the radio wave propagation status is a deterministic estimation technique.

9. A radio wave arrival status estimation method according to claim 6, wherein a ray tracing method is employed as a technique of estimating whether or not the propagation characteristic of the radio wave received at said reception point has reached said minimum allowable level.

10. A radio wave arrival status estimation method according to claim 9, wherein in said ray tracing method, at least one or more of a limit of not taking at least one propagation characteristic, out of reflection, transmission, diffraction, and irregular reflection, into consideration as a propagation characteristic that becomes a target of searching, and a limit of making magnitude of a propagation loss, which becomes a condition for terminating the searching in the ray searching, smaller than magnitude of an allowable propagation loss of the radio system are added.

11. A non-transitory computer readable storage medium storing a program for causing an information processing device to execute a process of:

receiving, at a reception point of a radio system, line of sight and reflected radio waves;

determining for each radio wave, by a deterministic estimation technique, whether or not an intensity of the main path of the radio wave to be evaluated is larger than a pre-decided threshold;

estimating that a propagation characteristic of the radio wave has reached a minimum allowable level when the intensity of said main path is smaller than said threshold;

estimating that it has not reached the minimum allowable level when the intensity of said main path is larger than said threshold;

estimating an arrival status of the radio wave at said reception point by applying a first estimation technique of a radio wave propagation status for the reception point at which it is estimated that said minimum allowable level has been reached; and estimating an arrival status of the radio wave at said reception point by applying a second estimation technique of a radio wave propagation status, being a technique of which a precision is higher than that of said first estimation technique of the radio wave propagation status, for the reception point at which it is estimated that said minimum allowable level has not been reached, wherein said deterministic estimation technique is a ray tracing process that considers some but not all of reflection, transmission, diffraction, and irregular reflection of the radio wave in estimating the propagation characteristic of the radio wave, the propagation characteristic being associated with which of the reflection, the transmission, and the irregular reflection are considered by said deterministic estimation technique, wherein the ray tracing process is terminated when a propagation loss of the some but not all of the reflection, the transmission, the diffraction, and the reflection that are considered is less than an allowable propagation loss of a radio system, and said propagation characteristic includes at least one of an intensity of the radio waves received at the reception point, existence or not of an the line of sight radio wave, an intensity of a main path, an arrival angle, a radiation angle, and a delay spread.

\* \* \* \* \*